United States Patent
Das et al.

(10) Patent No.: US 7,203,662 B2
(45) Date of Patent: Apr. 10, 2007

(54) APPARATUS, SYSTEM AND METHOD FOR AUTOMATICALLY MAKING OPERATIONAL SELLING DECISIONS

(75) Inventors: Rajarshi Das, New Rochelle, NY (US); James E. Hanson, Yorktown Heights, NY (US); Jeffrey O. Kephart, Cortlandt Manor, NY (US); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 09/915,986

(22) Filed: Jul. 25, 2001

(65) Prior Publication Data

US 2003/0023538 A1 Jan. 30, 2003

(51) Int. Cl.
*G06Q 40/00* (2006.01)

(52) U.S. Cl. .............. 705/37; 705/35; 705/26; 705/36; 705/80; 705/412

(58) Field of Classification Search ........... 705/35–37, 705/80, 50, 7, 412, 26; 700/99
See application file for complete search history.

(56) References Cited

U.S. PATENT DOCUMENTS

| 6,047,274 | A | * | 4/2000 | Johnson et al. ............. 705/412 |
| 6,338,050 | B1 | * | 1/2002 | Conklin et al. .............. 705/80 |
| 6,401,080 | B1 | * | 6/2002 | Bigus et al. ................ 705/37 |
| 6,647,374 | B2 | | 11/2003 | Kansal ....................... 705/37 |
| 2002/0016759 | A1 | * | 2/2002 | Macready et al. ........... 705/37 |
| 2002/0111874 | A1 | | 8/2002 | Al-Kazily ................... 705/26 |
| 2002/0120555 | A1 | * | 8/2002 | Lerner ....................... 705/37 |
| 2003/0014325 | A1 | * | 1/2003 | Biffar et al. ................ 705/26 |

OTHER PUBLICATIONS

Kenneth E Kendall "The expert's opinion" Information Resources Management Journal. Hershey: Jul.-Sep. 2001.vol. 14, Iss. 3; p. 47, 4 pgs.*

* cited by examiner

*Primary Examiner*—Jagdish N. Patel
*Assistant Examiner*—Harish T. Dass
(74) *Attorney, Agent, or Firm*—Duke W. Yee; Eustus D. Nelson; Lisa L. B. Yociss

(57) ABSTRACT

An apparatus, system and method for automatically making operation selling decisions are provided. The apparatus, system and method make use of selling policy rules established by human operators associated with a firm to guide the making of decisions to sell products and/or services. The actual decisions to sell are made automatically by the system without requiring human intervention. The decisions to sell are made by negotiating terms of sale with a customer using history information, exogenous preference information, information obtained from third parties, and the like. An initial offer of sale is provided to a customer who may then elect to modify the terms of sale of the product or service. If the customer elects to modify the terms of sale of the product or service, a negotiation engine of the present invention may automatically provide counteroffers to offers made by the customer until acceptable terms of sale are agreed upon. The negotiation with the customer occurs within the framework established by the selling policy rules established by the human operators. Because the actual decisions are performed automatically without human intervention, the decisions may be made much more quickly than would have been done by a human being.

43 Claims, 4 Drawing Sheets

APPARATUS, SYSTEM AND METHOD FOR AUTOMATICALLY MAKING OPERATIONAL SELLING DECISIONS

RELATED APPLICATION

This application is related to similar subject matter as commonly assigned and co-pending U.S. patent application Ser. No. 09/915,826, entitled "Apparatus, System and Method for Automatically Making Operational Purchasing Decisions," filed on even date herewith and hereby incorporated by reference.

BACKGROUND OF THE INVENTION

1. Technical Field

The present invention is directed to an improved data processing system. More specifically, the present invention is directed to an apparatus, system and method for automatically making operational selling decisions.

2. Description of Related Art

Traditionally, purchasers and sellers negotiate terms for the sale of products and services. The purchaser and seller come to an agreement that each feels is beneficial. A contract is established and the seller provides the product or service in exchange for consideration. Such exchanges occur thousands of times a day all over the world.

With businesses and companies, buying and selling are done on a much larger scale. Businesses and companies typically buy products and services in bulk based on the needs of the business or company. Such needs may be based on the operational goals of the company, for example.

Businesses have begun migrating to conducting commerce over data networks, such as the Internet. Such commerce typically involves a business offering its products and services for sale through web sites. A customer may access the business' web site using his/her computer and a web browser application. Once access is obtained, the customer may select products or services for purchase, fill in appropriate on-line forms, and provide billing and shipping information.

Such customers, however, are typically of the individual single sale type. That is, the customer is typically an individual and not a business. Moreover, the purchasing and selling arrangement is typically a nonnegotiable one. That is, the customer simply must accept the terms offered by the business if the customer wishes to make a purchase. Likewise, the business does not have any mechanism for adjusting the terms of sale of a product or service. In short, there is no mechanism for automatically making business decisions, such as purchasing or selling decisions, which may include negotiating the transaction.

Because the transaction is a nonnegotiable one, automation of the transaction is one-sided. That is, the vendor firms, i.e. sellers of products and services, provide an automatic mechanism for accepting orders but there is no automatic mechanism for the customer to purchase products and services. Similarly, there is no automatic mechanism for modifying the terms of sale of products and services to thereby negotiate a transaction with a customer.

Electronic marketplaces (e-Marketplaces) and other Business-to-Business transaction automation systems such as RosettaNet provide a degree of automation in placing and fulfillment of orders, both for buyers and for sellers. Typically, these systems require sellers to publish catalogs of goods for sale at predetermined prices. In addition to fixed catalogs, these systems are increasingly supporting online auctions as a means of setting prices dynamically. But they do not assist sellers in making tactical decisions on what goods to offer, how to price them, what bids to place, what terms of sale to accept, and so forth. All such decisions are made manually, by the sellers.

Similarly, purchasers using these systems are required to make all tactical decisions involved in making the purchase. The system's function is limited to assisting the purchaser in executing the actions triggered by his (manually entered) decisions.

Some auction systems, such as e-Bay and e-Snipe, provide consumers with "proxy bidder agents" that, in a trivial sense, automate certain aspects of the process of placing bids. In these systems, a buyer manually specifies certain runtime parameters of an "agent", such as a bid increment or a time to place a bid. The "agent" then places bids according to a predetermined algorithm whose operation is completely determined by the consumer-specified parameter values and the current state of the auction. None of these systems permit the automated incorporation of historical or contextual information, such as information relating to previous transactions or to the overall activity in the market, into the calculation of the bid.

Thus, it would be beneficial to have an apparatus, system and method for automatically making purchasing and selling decisions in a data network, in which historical or contextual information are automatically incorporated into the decision-making process.

SUMMARY OF THE INVENTION

An apparatus, system and method for automatically making operation selling decisions are provided. The apparatus, system and method make use of selling policy rules established by human operators associated with a firm to guide the making of decisions to sell products and/or services. The actual decisions to sell are made automatically by the system without requiring human intervention. The decisions to sell are made by negotiating terms of sale with a customer using history information, exogenous preference information, information obtained from third parties, and the like.

An initial offer of sale is provided to a customer who may then elect to modify the terms of sale of the product or service. If the customer elects to modify the terms of sale of the product or service, a negotiation engine of the present invention may automatically provide counteroffers to offers made by the customer until acceptable terms of sale are agreed upon.

The negotiation with the customer occurs within the framework established by the selling policy rules established by the human operators. Because the actual decisions are performed automatically without human intervention, the decisions may be made much more quickly than would have been done by a human being.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As more business relationships are conducted over the Internet, it will become easier for vendor firms to move to variable, and then negotiated pricing of the products and services that they offer for sale. It will also become easier for vendors to offer an increasing degree of configurability or customizability in their products, to the point that a firm may be able to treat nearly all product attributes as being configurable at the time of sale. This is especially true when the products are information goods or information services. The same increased configurability will also be seen in the bundling of goods, i.e. packaging of products together and offering the package for a single price.

A firm that can automate its purchasing and selling decisions stands to benefit from this dynamism and configurability in at least two ways. First, by reducing or eliminating the need for human involvement, the firm will drastically reduce the cost of making purchasing decisions. Second, the firm will be able to react much more quickly than a human, and possibly more accurately as well, to complex product-configuration opportunities, such as by taking advantage of favorable fluctuations in market prices, by exploiting or negotiating over complex bundling and nonlinear pricing schedules, or by participating in combinatorial auctions. In this way, the value obtained per dollar spent may be increased.

The present invention provides an apparatus, system and method for making operational purchasing and selling decisions in a data network. Because of the automatic decision making process of the present invention, the benefits of eliminating human involvement in operational decision making are obtained.

Figure 1:
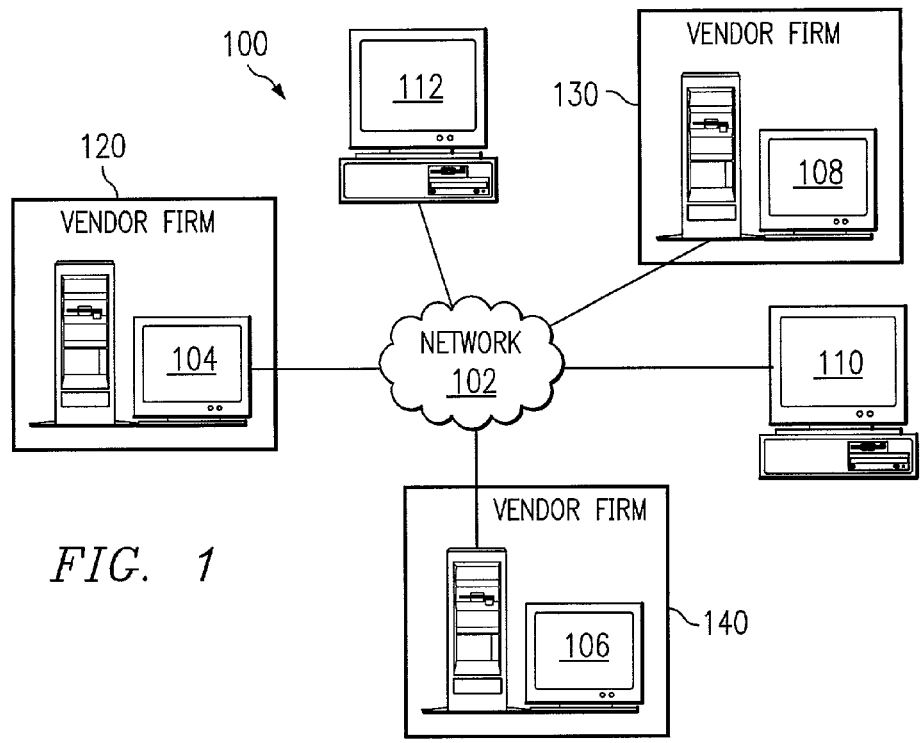
FIG. 1 is an exemplary block diagram of a network data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 106 and 108 are connected to network 102. In addition, clients 110 and 112 are connected to network 102. These clients 110 and 112 may be, for example, personal computers or network computers. In the depicted example, servers 104, 106 and 108 provide data and applications to clients 110 and 112, and may provide data and applications to other servers, as discussed in more detail hereafter. Clients 110 and 112 are clients to servers 104, 106 and 108. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

While the present invention may be implemented in a distributed data processing system such as that shown in FIG. 1, the present invention is not limited to any particular distributed data processing system architecture. Rather, the present invention may be implemented in any distributed data processing system without departing from the spirit and scope of the present invention. For example, rather than a server/client architecture, such as that shown in FIG. 1, the present invention may be implemented in a peer-to-peer distributed data processing system in which client computers communicate and interact with one another directly without requiring a server computing device to facilitate such interaction.

Figure 2:
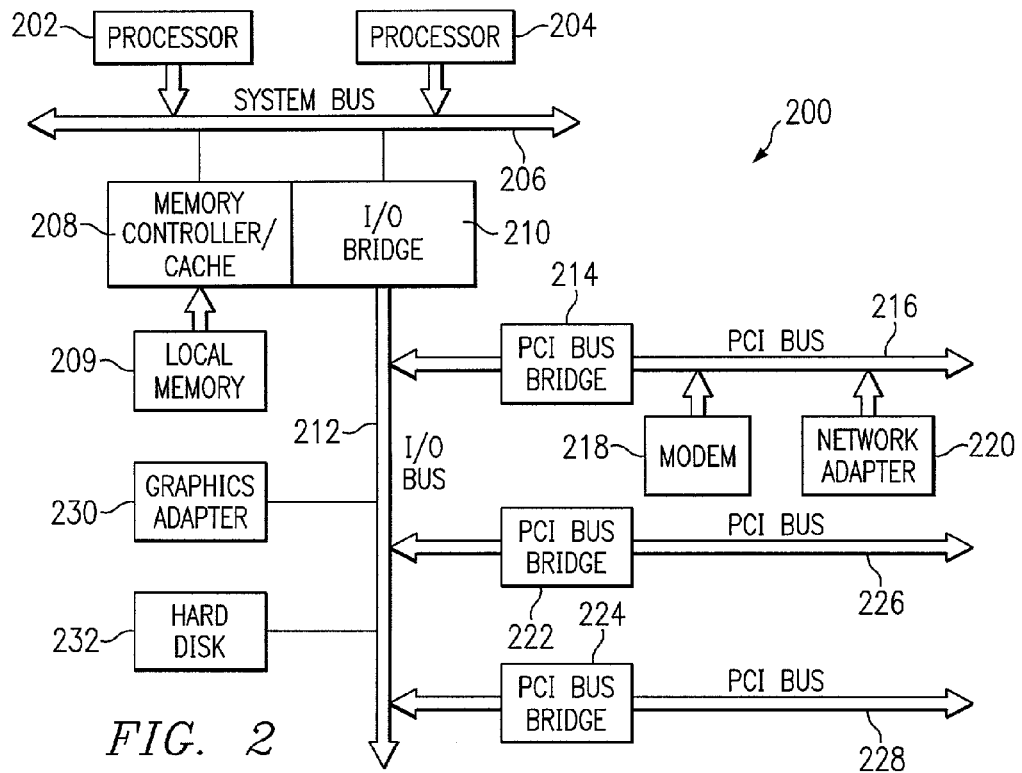
FIG. 2 is an exemplary block diagram of a server in accordance with the present invention.

Referring to FIG. 2, a block diagram of a data processing system that may be implemented as a server, such as servers 104, 106 and 108 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 110 and 112 in FIG. 1 maybe provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
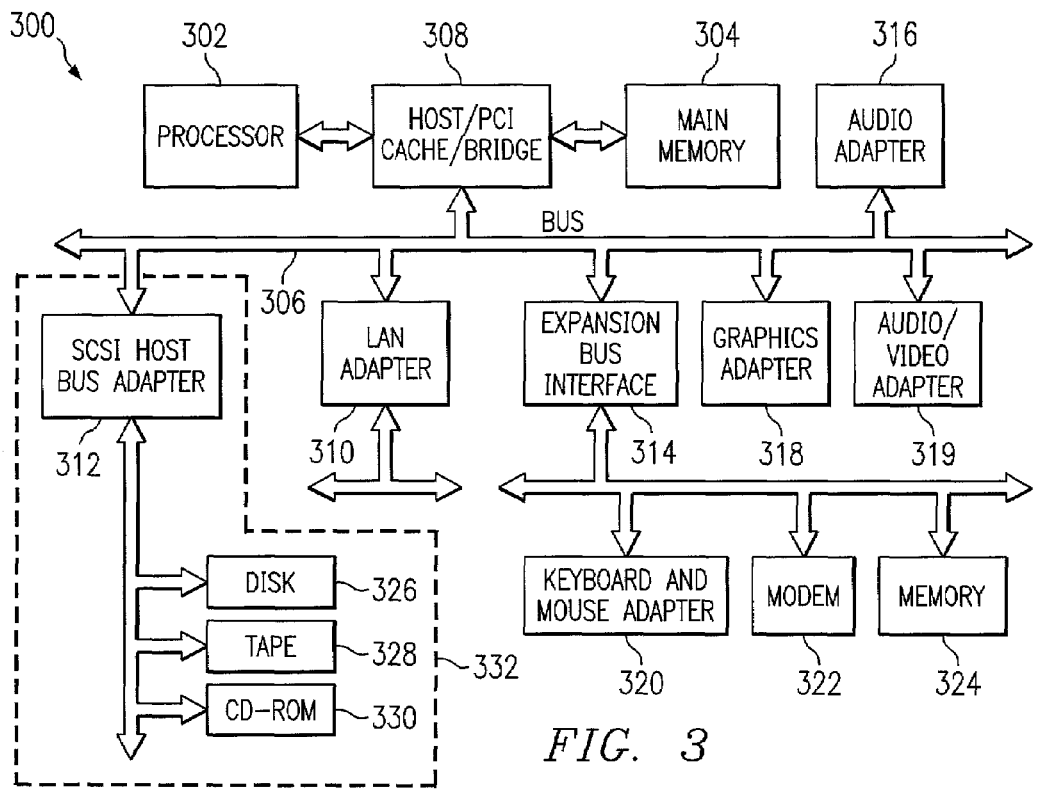
FIG. 3 is an exemplary block diagram of a client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Referring again to FIG. 1, the servers 104–108 may be associated with various product and/or service vendor firms 120–140. The vendor firms 120–140 may offer their products and/or services for sale using web sites established on servers 104–108, as is generally known in the art. Moreover, rather than having the vendor firms 120–140 have the equipment for maintaining the web sites, the vendor firms may contract with third parties to maintain the web sites on servers, server farms, or the like.

The servers 104–108 are preferably equipped with the apparatus, system and method of the present invention that enables these servers 104–108 to automatically make operational purchasing and/or selling decisions on behalf of the vendor firms 120–140. In addition, client devices 110–112 may also be equipped with the apparatus, system and method of the present invention to aid users of the client devices in automatically making operational purchasing and/or selling decisions.

For purposes of illustration, it will be assumed in the following examples that a first vendor firm, such as vendor firm 120, acts as a purchaser of products and/or services from a second vendor firm, such as vendor firm 130, which acts as a seller of products and/or services. Each vendor firm 120 and 130 may be equipped with the present invention or only one may be equipped with the present invention, depending on the particular situation. The present invention provides a mechanism for running a firm in such a way that operational business decisions related to purchasing, such as vendor selection and price negotiations, and operational business decisions related to selling, such as pricing and bundling decisions, are made automatically. In this way, a firm in which operational business decisions are typically made by human beings, at the speed by which human beings make decisions, may be automated to become a "digital firm" in which decisions and transactions may be made within seconds, or fractions of a second, of changes in the business environment. While the most benefit of the present invention may be obtained through a virtually complete automation of the business decision making process, clearly "hybrid" firms, in which the automation is partial, are also possible with the present invention.

The present invention will first be described with regard to an apparatus, system and method for automatically making operational purchasing decisions. The present invention will then be described with regard to an apparatus, system and method for automatically making operational selling decisions. It should be appreciated that while the functions of the present invention are being described separately for ease of explanation, the invention is not limited to performing one or the other function. Rather, the present invention may perform both automatic operational purchasing and selling decision making at virtually a same time without departing from the spirit and scope of the present invention.

While the present invention will be described in terms of "negotiations" between purchaser and seller computing systems, the functions of the present invention do not require actual negotiation. Rather, the term "negotiation" is used simply to refer to the process of making a business purchasing or selling decision. Such "negotiation" may entail offers and counteroffers, as is generally understood to be involved in a "negotiation," or may simply be a "take-it-or-leave-it" negotiation in which a product is offered for sale with nonnegotiable terms. Any type of operational business purchasing and/or selling decision is intended to be within the scope of the term "negotiation" as it is used in this disclosure.

Referring to FIG. 1, with the present invention, vendor firm 120 makes use of server 104 to perform automated purchasing decisions in accordance with the present invention. The present invention may be implemented in hardware, software, or a combination of hardware and software. In a preferred embodiment, the present invention is implemented as software instructions executed by a processor, such as processor 202, 204 or 302. However, as is known to those of ordinary skill in the art, software instructions may be hard-coded into hardware elements and thus, the present invention may be implemented has hardware elements without departing from the spirit and scope of the present invention.

With the present invention, human beings associated with the vendor firm 120 define a set of short or long term strategic purchasing policies for the firm. These short or long term strategic purchasing policies are reduced to sets of rules that may be used by the present invention to guide purchasing decision making. The short or long term strategic purchasing policy rules may include, for example, an identification of the types of products or services that the firm wishes to purchase over a specified period of time, preferred terms and conditions, preferred shipping or delivery policies, desired expiration times on orders, target purchase prices, thresholds for maximum purchase prices, target values for product or vendor quality metrics, rank orderings or relative weights for calculating tradeoffs among different product or vendor attributes, sets of products that may be substituted for each other (with or without information about relative preferences), default policies for product returns, rank ordered or weighted lists of preferred vendors, preferred payment methods, parameters used in the automated price calculation algorithms, and the like. These rules may be changed when the policies of the firm change. Thus, in order to enable the present invention to perform different operations in support of the firm's goals, the firm need only change the short or long term strategic purchasing policy rules and these changes will influence the overall operation of the present invention.

Thus, the short or long term strategic purchasing policy rules identify a set of products or services, which may contain optional elements or alternative choices, which are desired to be purchased. For example, the short or long term strategic purchasing policy rules may indicate that the firm needs to purchase engine controllers having diagnostic software instructions built into the controller, having the ability to control the operations of both truck and automobile engines, and that the engine controller should not cost more than $320.00. Or, alternatively, the calculation of the maximum acceptable price may be performed at the time the purchase is being negotiated, depending upon the current inventory, number of unfilled orders, etc.

While the short or long term strategic purchasing policy rules may be provided by human beings associated with the firm, the actual selection of the seller from which to make a purchase, the price to be paid for the products or services, and other terms of the purchase are not specifically set forth in the strategic purchasing policy rules, however. It is these types of decisions that are made automatically by the present invention within the guidelines set by the strategic purchasing policy rules.

The products or services (hereafter only referred to as products for readability) identified in the strategic purchasing policy rules are associated with values that are used by the present invention to establish parameters for negotiating the purchase of these products from sellers. These values may include, for example, a maximum price to be paid for the products, a maximum number of products for purchase, sets of products that may be substituted for each other, possibly with information about which sets are preferred, information such as rank orderings or weights for determining tradeoffs among imperfectly substitutable products, information for determining tradeoffs between product prices, order size, and delivery times, information for determining tradeoffs between product prices and vendor preferences, thresholds for minimum acceptable quality measures (such as rated strength of machine bolts, etc.), and the like. Moreover, the products to be purchased may be associated with multi-attribute utility functions, which describe the interrelated values of multiple attributes of products to be purchased.

For example, two products may both meet the purchaser's needs: a lower-quality product at a lower price, and a higher-quality product at a higher price. In such a situation, the purchasing system may use a multi-attribute utility function which quantifies the relative utilities of (price, quality) pairs, to determine which of the two products is best overall.

Similarly, the product with the lowest price may be available from a vendor with a mediocre reputation. In such a case, the purchaser may use a multi-attribute utility function to determine whether to pay a lower price to a less-desirable vendor, or pay a higher price to a more-desirable vendor. In this way, tradeoffs between negotiable attributes of the products may be evaluated by the negotiation engine of the present invention during negotiation with product vendors.

The values associated with the products may be fixed or dynamic values that are set, for example, by a human associated with the firm. Alternatively, these fixed or dynamic values may also be determined by automated or semi-automated means, such as an automated optimization system that factors in cost of materials and product, expected consumer demand, and other market factors to determine the values to assign to different products or sets of products for purchase. These values may be dynamic in that as market conditions change, the values may be updated in a manual, automatic, or semiautomatic manner.

Regardless of the specific manner by which the values are obtained, the various values are input to the automated purchase decision making apparatus, system and method of the present invention and are used as a basis for structuring the operational purchase decision making of the present invention. The automated purchase decision making apparatus, system and method of the present invention makes use of automated processes for taking as inputs the descriptions of the desire products including their values, and carrying out one or more prescribed selection and/or negotiation strategies. In particular, the present invention executes instructions, based on the product descriptions and the purchase policy rules input by the firm, for selecting a potential vendor or set of potential vendors from which to purchase the products.

Such selection may further be based on other data either compiled by the present invention or obtained from third parties. This information may include, for example, previous history with vendors and marketplaces, such as a history of products that have been available from the vendor or marketplace, a negotiation history (are they reasonable, easy to negotiate with, do negotiations tend to work in the firm's favor?), fulfillment history (did they behave as expected and in accordance with negotiated transaction terms), and the like.

In addition to the previous history information, the present invention may further use exogenous preferences or constraints to influence the selection of a vendor or marketplace. For example, this exogenous preference or constraint information may include the names of known vendors to prefer or avoid, rank orderings of vendors to prefer for certain types of products, and the like.

Moreover, the present invention may make use of information indicating the interoperability mechanisms (e.g., negotiation protocols, etc.) that the vendor supports, which types of products are available from the vendor, vendor reputation, nonnegotiable product attributes, and the like, to determine which vendors to select. All of this information may be compiled by the apparatus, system and method of the present invention or may be obtained from third parties, such as through network-based databases or the like.

For example, the present invention may compile previous history information, obtain interoperability mechanism information and available product type information from Universal Description, Discovery, and Integration of business on the web (UDDI) (see www.uddi.org), obtain vendor reputation information from a third party system, and obtain nonnegotiable product attributes such as vendors' published prices, shipping times and costs, etc., using a third party shopbot service or the like. In using a shopbot, for example, the purchasing system would send a specification of the desired products to the shopbot service, which commonly would return to the purchasing system information about the price, availability, deliver time, delivery cost, etc., gathered from a multiplicity of vendors that offer those products for sale (e.g., by accessing vendor web sites and processing the information therein). It should be noted that if a third party is used as a source of the information on vendors and products, it may be the case that this information must be purchased from the third party. In such a case, the information itself may constitute a needed product and it therefore, may be purchased using the mechanisms of the present invention as well.

After or during the selection process of one or more potential vendors from which to purchase a needed product, the present invention may automatically negotiate the purchasing transaction. The negotiation may take any of a number of forms. For example, the present invention may examine products for purchase in an on-line catalog of the vendors (if available) and select vendors based on a comparison of the prices and the preset maximum price for the products (provided in the purchasing policy rules). In addition, the present invention may compare the price of a first vendor with other vendors of the one or more selected vendors.

As another example, the present invention may place bids in a continuous double auction according to one or more of the automated strategies described in Das et al., "Agent-Human Interactions in the Continuous Double Auction," Proceedings of the International Joint Conference on Artificial Intelligence, Seattle, 2001, which is hereby incorporated by reference. Similar strategies as that with the double auction may be used with a standard English auction.

Moreover, the present invention may negotiate the transaction by haggling over price, product bundles, attributes deemed negotiable by the seller, or the like. All of these various negotiation techniques may be used based on rules or parameters established in the negotiation engine of the present invention. Examples of these parameters include: thresholds on maximum price to offer; parameters of algorithms used to calculate the maximum price to offer (which may depend on the purchaser's current business needs); thresholds on minimum acceptable quality; time-sensitive parameters, such as how long before the end of an auction to stop trying to get a better deal; preferred increments in price when making counteroffers; preferences, weights, or rank orderings for evaluating tradeoffs among alternatives (where the alternatives may be among substitutable products, product attributes, terms & conditions, delivery times or costs, vendor attributes, etc.); tunable parameters of the particular algorithms used in calculating offers; rank orderings of preferred algorithms to use with particular vendors, based on past performance; information about which negotiation protocols the different vendors support, etc.

As with the selection of vendors and marketplaces described above, the negotiation engine may make use of previous history information, exogenous preferences or constraints, interoperability mechanism information, vendor reputation, nonnegotiable product attributes information, and the like, to guide the operation of the negotiation engine and influence the offers and acceptances generated by the negotiation engine and presented to product vendors.

It should be noted that the vendor and marketplace selection and the purchase negotiation described above may be interdependent. That is, the vendor selected by the present invention may depend on the outcome of the negotiation with various vendors under consideration. Similarly, the options available for negotiation are determined in part by the capabilities of the vendor selected.

For purposes of illustration only, the following simple example of the purchasing system's operation is provided. This example is chosen for its simplicity, and should not be taken as a limitation the system's function. In this example, the purchasing system of the present invention takes the following steps in negotiating a purchase of a certain product:

(i) Retrieve a list of known vendors, and their know attributes (such as reliability) from the system's internal database. In addition, query a directory service, such as UDDI, for information about new vendors, and add them to the list of vendors. Optionally, query a third party for further information about those vendors, such as reliability statistics.

(ii) From each vendor, obtain information about the availability of the desired product and information about which aspects of the purchase are negotiable. Suppose that some vendors state that the product is unavailable, some list the product's price as negotiable in one-on-one haggling, some list it as available via an online auction, and others give the price and list it as non-negotiable.

(iii) Each of the vendors that stated the product was not available are removed from further consideration.

(iv) With each of the vendors for which price was negotiable via one-on-one negotiation, initiate a negotiation. This may be done by sending an initial offer calculated by means of the purchasing system's internal rules and parameters, and may depend on factors such as the time at which the product is needed. The negotiation may then proceed by back-and-forth sequence of offers and counteroffers. Each time a counteroffer is received, the purchasing system determines whether it is acceptable, using its internal rules and parameters, historical information stored from previous negotiations (such as, whether this particular vendor has been willing to reduce price in previous encounters), and by reference to the relative desirability of other provisional deals under consideration. If the counteroffer is deemed acceptable, the system stops further negotiations with that vendor, but does not (yet) commit to the purchase. If not, the system may make a further counteroffer, which would be calculated by means of the system's internal rules and parameters, by the historical information stored from previous purchases from that vendor, and/or of that product, etc., and by reference to the best provisional deals that were currently available from other vendors.

Alternatively, the system may break off negotiations with a vendor, e.g., if the other party was not making sufficiently desirable counteroffers. Again, this decision would be governed by the internal rules and parameters. As part of the calculation process, the counteroffers may take into account the tradeoffs in product & vendor attributes noted above.

(v) For those vendors that listed the product as available via on-line auction, the system may enter into the auction. Whether it placed a bid, and for how much, may be determined in an analogous way to the calculation in step (v).

(vi) For those vendors that listed the prices as non-negotiable, the price is noted as the "best" available price from that vendor.

(vii) At some point determined by the system's internal rules & parameters, the system may terminate all negotiations, and decide either to buy the products from a particular vendor or vendors or decide not to buy it at that time. This decision would be determined by the rules and parameters governing preferences among vendors and substitutable products, the stored information about previous experience with the vendors (such as reliability information), and by the relative desirability of the individual provisional deals. If multiple products are needed, the system may alternatively distribute the orders among multiple vendors in such as way as to get the best overall deal.

Once negotiations are concluded, the present invention further includes processes for making the purchase from the selected seller. These processes may include instructions for generating purchase orders and transmitting them to the selected product vendors, for example. These processes may further include instructions for authorizing and providing payment.

In addition, the present invention further includes processes for generating records and summaries of actions taken which may be used as input data for future purchase decisions as well as for tracking the operation of the automated purchase decision making apparatus. These records may further include indications of whether the vendor complied with the negotiated transaction terms. For example, the records and summaries may indicate whether the vendor delivered on time, whether the goods were as ordered, did the vendor elect to negotiate, the negotiation protocols supported by the vendor, the final outcome of the negotiation, the purchase price, the vendor's initial offer, the history of offers and counteroffers, and the like. This information may be automatically compiled during and after the automated negotiation and selection described above, for example.

Alternatively, some of this information may be input by a human associated with the firm after the negotiation and selection, e.g., whether the goods were as ordered and whether delivery was on time. Delivery information, for example, may be gathered automatically, such as by querying the business' inventory management system, or may be entered into the system manually, e.g., by a shipping clerk. Similarly, determination of whether the goods were as ordered, and of the actual quality of the goods delivered, may be determined automatically, such as by querying an automated production line or product testing system for defect rates, or may be entered manually, e.g., by a quality control inspector. The statistics of delivery times, order correctness, product quality, and other similar factors would be used by the purchasing system to help calculate the relative desirability of different vendors, according to an algorithm specified in the system's internal rules and parameters.

Figure 4:
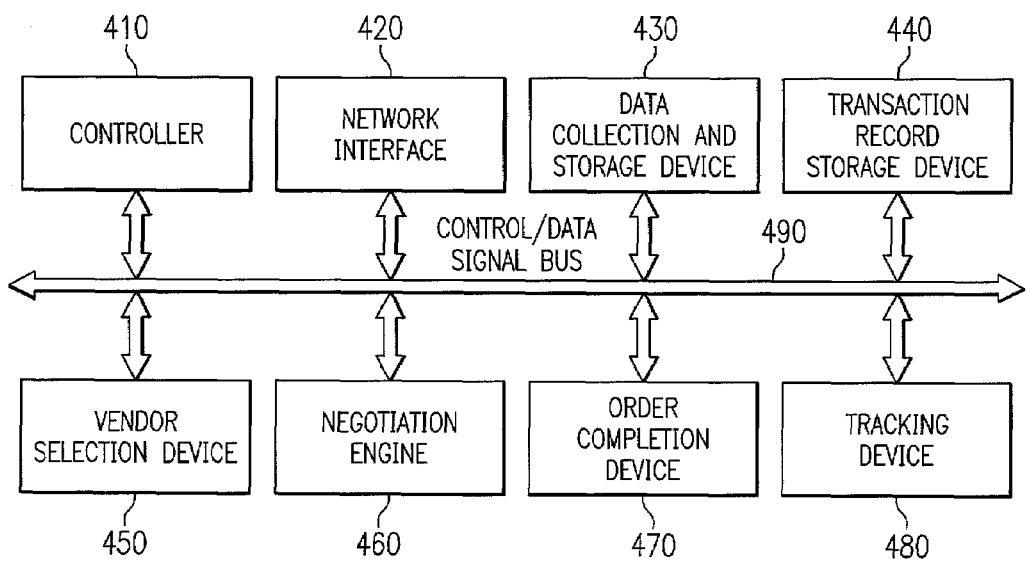
FIG. 4 is a block diagram of a operational purchasing decision making apparatus according to the present invention.

FIG. 4 is an exemplary block diagram of an apparatus for automatically making operational purchasing decisions in accordance with the present invention. While FIG. 4 shows the various elements of the present invention as hardware elements, it should be appreciated that these elements may be embodied as software instructions executed by hardware elements, or a combination of hardware elements and software instructions without departing from the spirit and scope of the present invention.

As shown in FIG. 4, the apparatus 400 includes a controller 410, a network interface 420, a data collection and storage device 430, a transaction record storage device 440, a vendor selection device 450, a negotiation engine 460, an order completion device 470, and a tracking device 480. These elements are coupled to one another via the control/data signal bus 490. Although a bus architecture is shown in FIG. 4, the present invention is not limited to such an architecture. Any configuration of the elements shown in FIG. 4 that facilitates the exchange of control and data signals between the elements may be used without departing from the spirit and scope of the present invention.

The controller 410 controls the overall operation of the apparatus 400 and orchestrates the operation of the other elements 420–480. In operation, the controller 410 receives operational purchasing policy rules from a human operator either directly by way of a human interface (not shown) or via the network interface 420. These operational purchasing policy rules may be stored in a memory (not shown) associated with the controller 410, in a storage device, or the like. Based on these operational purchasing policy rules, the controller 410 initiates a purchase operation which entails selecting potential vendors, performing negotiations, completing the purchase transaction, and generating records of the purchase transaction, as described previously.

In particular, the controller 410 instructs the vendor selection device 450 to select one or more potential vendors for the products or services designated in the operational purchasing policy rules submitted by the human operator. The vendor selection device 450 retrieves information regarding the product and vendors from the data collection and storage device 430 and transaction record storage device 440. The data collection and storage device 430 stores information regarding vendors and products that are input by human operators or collected by third parties. The transaction record storage device 440 stores transaction records and history information regarding previous dealings with various vendors. Based on the information obtained from these sources, and criteria set forth in rules associated with the vendor selection device 450, the vendor selection device 450 selects one or more potential vendors from which to purchase the needed products.

Once the selection of the potential vendors is performed by the vendor selection device 450, the controller 410 instructs the negotiation engine 460 to perform negotiations with the one or more potential vendors using negotiation protocols supported by the vendors. The identification of the negotiation protocols used by the various vendors may be obtained from the information stored in the data collection and storage device 430, for example. The negotiations may entail a series of transaction messages being sent to, and received from, the various vendors by way of the network interface 420. Once negotiations are completed either favorably or unfavorably, the controller 410 selects one or more of the potential vendors from which to purchase the needed products. The selection of the one or more potential vendors may be based on the results of the negotiations as well as vendor reputation, previous history with the vendors, and the like. Thus, the selection of a vendor may not necessarily always be the vendor that provides the lowest price for the products.

The controller 410 then instructs the order completion device 470 to generate purchase orders and transmit them to the selected vendors via the network interface 420. In addition, the order completion device 470 performs functions to authorize or provide payment for the products.

During selection of vendors, negotiation, and completion of the purchase orders, the tracking device 480 compiles information about the vendors, offers, transactions, and the like. This information is stored as transaction and vendor information in the transaction record storage device 440 for later use in making purchasing decisions. The information may further be output to other devices for use in tracking the completion of the purchase order on the part of the product vendors.

Figure 5:
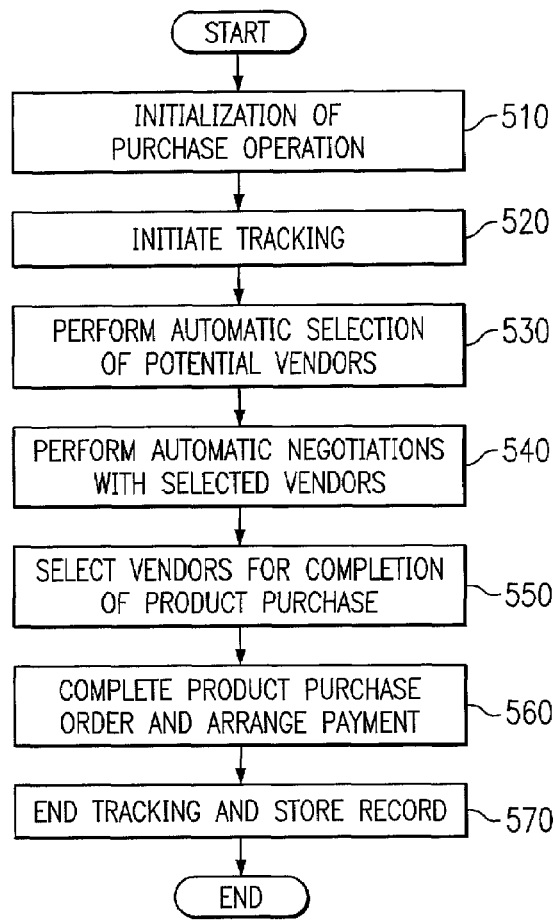
FIG. 5 is a flowchart outlining an exemplary operation of the operational purchasing decision making apparatus according to the present invention.

FIG. 5 is a flowchart outlining an exemplary operation of the present invention when performing automatic operational purchasing decisions. As shown in FIG. 5, the operation starts with an initiation of a purchase operation (step 510). The tracking of the purchase operation is initiated (step 520) and automatic selection of potential vendors is performed (step 530) based on purchase policy rules and compiled vendor and product data. Automatic negotiations are then made with the selected potential vendors (step 540) and vendors are selected for completion of the product purchase (step 550) based on the results of the negotiations and compiled vendor and product data. The product purchase order is then completed and payment is arranged (step 560). The tracking of the purchase operation is then ended and a record of the purchase operation and vendor information is stored (step 570). The operation then ends.

Thus, the present invention provides a mechanism by which the operational purchasing decisions of a firm are automated to thereby perform purchasing decisions without the need for human intervention. The present invention takes purchasing policy rules input by a human operator as a guide by which the operational purchasing decisions are made. The selection of vendors and negotiation and completion of the purchase transaction are performed automatically without the need for a human operator.

In addition to performing operational purchasing decisions automatically, the present invention is further able to make operational selling decisions automatically in a similar manner. Such operational selling decisions may be made virtually simultaneously with the making of operational purchasing decisions. That is, the same computing system may be involved in making both operational purchasing and selling decisions at approximately the same time. Alternatively, a first computing system in a transaction may be using the automatic operational purchasing decision making apparatus of the present invention while a second computing system in the transaction is using the automatic operational selling decision making apparatus of the present invention. In this way, a fully automatic transaction system may be provided by the present invention.

With regard to making automatic operational selling decisions using the present invention, this aspect of the present invention makes use of similar apparatus and methods as that described above with regard to the automatic making of purchasing decisions. Rather than selecting a vendor and negotiating the terms of purchasing a product from the purchaser's point of view, however, the automatic operational selling decisions of the present invention attempt to determine an initial offer of sale of a product and negotiate terms of sale with potential purchasers. The initial offer of sale may take the form of an entry in a catalog, a specific targeted offer of sale, and the like. The initial offer of sale preferrably describes the non-negotiable attributes of the sale and gives information about the negotiable attributes, e.g., the tensile strength may be provided however, the price may not be given. Both of these aspects of the present invention make use of acquired information and strategic rules defined by the firm to guide the making of these decisions, as described in greater detail hereafter.

With the automatic operational selling decision making apparatus of the present invention, again a human operator associated with a vendor firm may input selling policy rules that govern the operation of the present invention in making operational business selling decisions. These selling policy rules may include, for example: an identification of the types of products or services that the firm wishes to sell over a specified period of time; preferred terms and conditions; preferred shipping or delivery policies; desired expiration times on orders; target selling prices; thresholds for minimum selling prices; target values for purchaser quality metrics (e.g., credit rating); records of previous sales made to individual purchasers and information extracted from such records; identities, amounts, and values of products previously sold; pre-agreed terms such as discount rates for specific purchasers or categories of purchaser; preferred or required bundles of products (i.e., products that must be purchased together), with or without information for calculating relative values or tradeoffs between bundles; rank orderings or relative weights for calculating tradeoffs among different purchaser attributes; sets of products that may be offered as substitutes for each other (with or without information about relative preferences and values); default policies for product returns; rank ordered or weighted lists of preferred purchasers; preferred payment methods; parameters used in the automated price calculation algorithms; and the like.

These rules may be changed when the policies of the firm change. Thus, in order to enable the present invention to perform different operations in support of the firm's goals, the firm need only change the strategic selling policy rules and these changes will influence the overall operation of the present invention.

Thus, the strategic selling policy rules identify a set of products or services, which may contain optional elements or alternative choices, which are desired to be sold. For example, the strategic selling policy rules may indicate that the firm needs to sell engine controllers, that the engine controllers may be bundled with software to be run on the engine controllers, and that the engine controller should not sell for less than $250.00 by itself, and not less than $300.00 when bundled with the software. Alternatively, the calculation of the minimum acceptable price may be performed at the time the sale is being negotiated, depending upon the current inventory, number of unfilled orders, etc.

While the strategic selling policy rules may be provided by human beings associated with the firm, the actual decision of whether to sell the product or service to a potential purchaser, the price to be paid for the products or services, and other terms of the purchase are not specifically set forth in the strategic selling policy rules, however. It is these types of decisions that are made automatically by the present invention within the guidelines set by the strategic selling policy rules.

The products or services (hereafter only referred to as products for readability) identified in the strategic selling policy rules are associated with values that are used by the present invention to establish parameters for negotiating the sale of these products to purchasers. These values may include, for example, a minimum price to be paid for the products, a minimum number of products for purchase, sets of products or bundles that may be offered as substitutes for each other, possibly with information about relative valuations or tradeoffs, information, such as rank orderings or weights, for determining tradeoffs among imperfectly substitutable products, information for determining tradeoffs between product prices, order size, and delivery times, information for determining tradeoffs between product prices and vendor preferences, thresholds for minimum acceptable quality measures (such as rated strength of machine bolts, etc.), and the like. Moreover, the products to be purchased may be associated with multi-attribute utility functions, which describe the interrelated values of multiple attributes of products to be sold.

The values associated with the products may be fixed or dynamic values that are set, for example, by a human associated with the firm. Alternatively, these fixed or dynamic values may also be determined by automated or semi-automated means, such as an automated optimization system that factors in cost of materials and product, expected consumer demand, and other market factors to determine the values to assign to different products or sets of products for sale. These values may be dynamic in that as market conditions change, the values may be updated in a manual, automatic, or semiautomatic manner.

Regardless of the specific manner by which the values are obtained, the various values are input to the automated selling decision making apparatus, system and method of the present invention and are used as a basis for structuring the operational selling decision making of the present invention. The automated selling decision making apparatus, system and method of the present invention makes use of automated processes for taking as inputs the various values, along with the seller's stated goals (such as descriptions of products desired to be sold), and carrying out one or more prescribed negotiation strategies for selling the product to a customer.

In particular, the present invention executes instructions, based on the product descriptions, the selling policy rules input by the firm, previous history information obtainable from databases maintained by the system or third parties, other information available from third parties regarding the products and/or purchasers, and the like, to determine acceptable terms of sale of the products or services. The information obtained may include, for example, production costs of the products, prices of similar or competing products, current or past sales and income on different products, estimates of historical measures of customer demand, customer's browsing history (click streams), and the like.

In addition to this previous history and third party information, the present invention may further use exogenous preferences or constraints to influence the decision to sell a product to a particular purchaser. For example, this exogenous preference or constraint information may include the names of known purchasers that should be preferred or avoided, rank orderings of purchasers to prefer or avoid for certain types of products, and the like.

Based on the available information and the selling policy rules established by the firm, the automated selling decision making system of the present invention may offer products for sale at particular terms. A purchaser may elect to enter into a negotiation with the automated selling decision making system to change the terms of this initial offer of sale. Based on the available information from maintained databases, third parties, history information, and the like, the automated selling decision making system may modify the terms of the sale within the guidelines of the selling policy rules established by the firm.

Once a purchaser has initiated a negotiation with the automated selling decision making system of the present invention, the negotiation may take any of a number of forms. For example, the automated selling decision making system of the present invention may make use of price-setting methods similar to that described in Jeffrey O. Kephart, James E. Hanson, and Amy R. Greenwald, "Dynamic Pricing by Software Agents", Computer Networks, 32:751–752, 2000, which is hereby incorporated by reference, to adjust a posted price of the product based on the revenue the firm makes from the sale of the product. Similarly, the present invention may make use of other techniques for forecasting prices in a competitive manner.

If the product is to be sold through a double auction, for example, the automated bidding methods described in Das et al., "Agent-Human Interactions in the Continuous Double Auction" may be employed by the present invention, as discussed above with regard to automatically making business purchasing decisions. If the product is to be sold through an English auction, the automated processes of the present invention may be used to determine a starting price, a reserve price, and other auctions parameters.

Moreover, the present invention may negotiate the transaction by haggling over price, product bundles, attributes deemed negotiable by the seller, and the like. All of these various negotiation techniques may be used based on rules or parameters established in the negotiation engine of the present invention. Examples of these parameters include: thresholds on minimum acceptable price; parameters of algorithms used to calculate price changes to offer; thresholds on minimum acceptable quality; time-sensitive parameters; preferred increments in price when making counteroffers; preferences, weights, or rank orderings for evaluating tradeoffs among alternatives; tunable parameters of the particular algorithms used in calculating offers; rank orderings of preferred algorithms to use with particular purchasers, based on past performance, etc.

As with the determination of the terms of an initial offer of sale for the product, the negotiation engine may make use of previous history information, exogenous preferences or constraints, purchaser reputation, nonnegotiable product attributes information, and the like, to guide the operation of the negotiation engine and influence the offers and acceptances generated by the negotiation engine and presented to product purchasers.

For purposes of illustration only, the following simple example of the purchasing system's operation is provided. This example is chosen for its simplicity, and should not be taken as a limitation of the system's function.

Assume that a firm posts non-negotiable prices for the products it sells, but modifies those prices automatically based on its own measure profit rates. It is assumed that the firm has a Web storefront (online catalog and shopping cart system), but it also has automated tracking of sales revenue and automated selling decision making system that processes sales revenue data, determines new prices for products, and updates the online catalog. Every so often, the human operators may adjust the parameters of the automated selling decision making system, e.g., upper and lower bounds on sale price, but they do not need to make themselves involved in the numerous actual business selling decisions being made. Rather, the automated selling decision making system of the present invention is used to manage the business selling decisions being made on a second by second basis.

Once negotiations are concluded, the present invention further includes processes for making the sale to the purchaser. These processes may include instructions for generating invoices and transmitting them to the warehouse or product supplier, for example. These processes may further include instructions for verifying and accepting payment.

In addition, the present invention further includes processes for generating records and summaries of actions taken which may be used as input data for future operational selling decisions as well as for tracking the operation of the automated selling decision making apparatus. These records may further include indications of whether the purchaser complied with the negotiated transaction terms. This information may be automatically compiled during and after the automated negotiation and selection described above, for example, or may be manually input by a human associated with the from after the negotiation is concluded.

Figure 6:
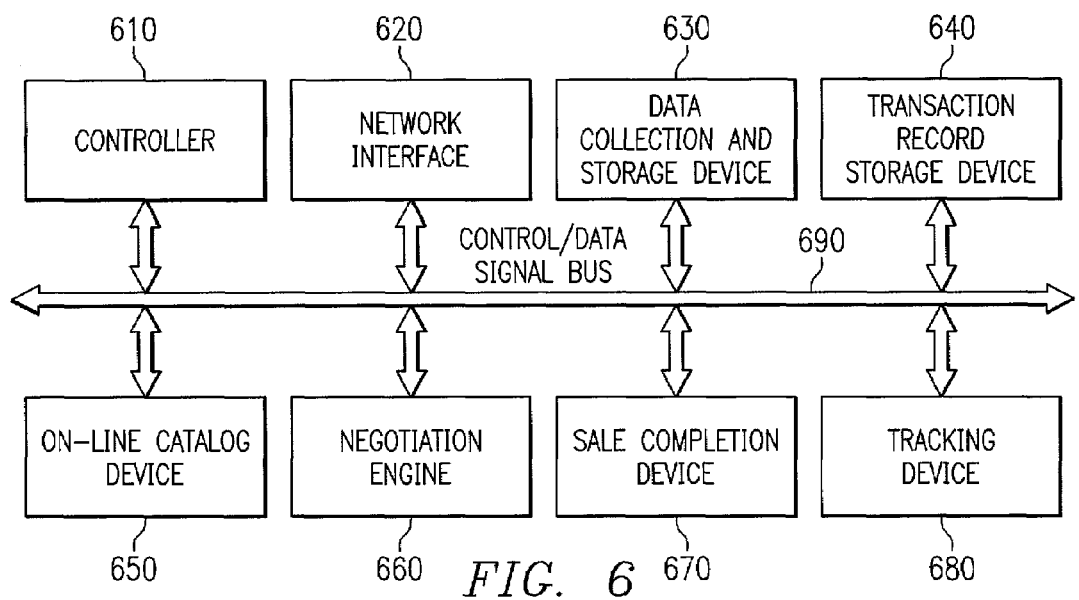
FIG. 6 is a block diagram of an operational selling decision making apparatus according to the present invention.

FIG. 6 is an exemplary block diagram of an apparatus for automatically making operational selling decisions in accordance with the present invention. While FIG. 6 shows the various elements of the present invention as hardware elements, it should be appreciated that these elements may be embodied as software instructions executed by hardware elements, or a combination of hardware elements and software instructions without departing from the spirit and scope of the present invention.

As shown in FIG. 6, the apparatus 600 includes a controller 610, a network interface 620, a data collection and storage device 630, a transaction record storage device 640, an on-line catalog device 650, a negotiation engine 660, a sale completion device 670, and a tracking device 680. These elements are coupled to one another via the control/data signal bus 690. Although a bus architecture is shown in FIG. 6, the present invention is not limited to such an architecture. Any configuration of the elements shown in FIG. 6 that facilitates the exchange of control and data signals between the elements may be used without departing from the spirit and scope of the present invention.

The controller 610 controls the overall operation of the apparatus 600 and orchestrates the operation of the other elements 620–680. In operation, the controller 610 receives operational selling policy rules from a human operator either directly by way of a human interface (not shown) or via the network interface 620. These operational selling policy rules may be stored in a memory (not shown) associated with the controller 610, in a storage device, or the like. Based on these operational selling policy rules, the controller 610 instructs the negotiation engine 660 initiates an offer of sale operation which entails determining an initial offer of sale for one or more products, updating an online catalog, performing negotiations, completing the sale transaction, and generating records of the sale transaction, as described previously.

In particular, the controller 610 instructs the negotiation engine 660 to determine an initial offer of sale for one or more products. The negotiation engine 660 retrieves information regarding the products, the market, previous sales history, and the like, from the data collection and storage device 630 and transaction record storage device 640. The data collection and storage device 630 stores information regarding products, comparable products, prices of other product vendors, market information, and the like, that are input by human operators or collected by third parties. The transaction record storage device 640 stores transaction records and history information regarding previous dealings with various purchasers. Based on the information obtained from these sources, and criteria set forth in rules associated with the negotiation engine 660, the negotiation engine 660 determines one or more terms of an initial offer of sale for one or more products.

Once the terms of the initial offer are determined by the negotiation engine 660, the controller 610 instructs the online catalog device 650 to update the online catalog being presented to potential purchasers. The controller 610 then waits for an initiation of a negotiation by a potential purchaser. During the waiting period, the controller 610 may continuously or periodically monitor changes in market conditions to thereby update the terms of the offer of sale of the various products in the online catalog.

Once a purchaser initiates contact with the seller, e.g., by requesting information about products in the catalog, the seller may tailor the information sent to the purchaser based on personalization information about the purchaser's attributes, such as his preferences. This personalization information may have been obtained from previous interactions with the purchaser, or from third parties, and may be augmented by information obtained during the course of the purchaser's present interaction. Alternatively, the seller might initiate contact with known purchasers, sending information on initial offers of sale to purchasers deemed likely to be interested.

Once a potential purchaser initiates a negotiation for the sale of a product, via the network interface 620 for example, the controller 610 instructs the negotiation engine 660 to enter into negotiation with the potential purchaser. The negotiations may entail a series of transaction messages being sent to, and received from, the purchaser by way of the network interface 620.

The negotiation engine 660 gathers information from the various available sources and makes determinations on the attributes and decision points in negotiations with the potential purchaser. For example, if non-negotiable posted pricing is used, the new prices are determined and published in the online catalog. If prices may be negotiated, a decision is made whether to accept, reject or make a counteroffer based on the offer received from the potential purchaser. In addition, the negotiation may include making offers with regard to bundling of products in an attempt to maximize the profit of the firm.

Once negotiations are completed favorably, the controller 610 may instruct the sale completion device 670 to complete the sale of the product(s) under the terms of sale negotiated by the negotiation engine 660.

During negotiation and completion of the sale, the tracking device 680 compiles information about the offers, transactions, and the like. This information is stored as transaction information in the transaction record storage device 640 for later use in making selling decisions. The information may further be output to other devices for use in tracking the completion of the sale on the part of the warehouse or product supplier.

Figure 7:
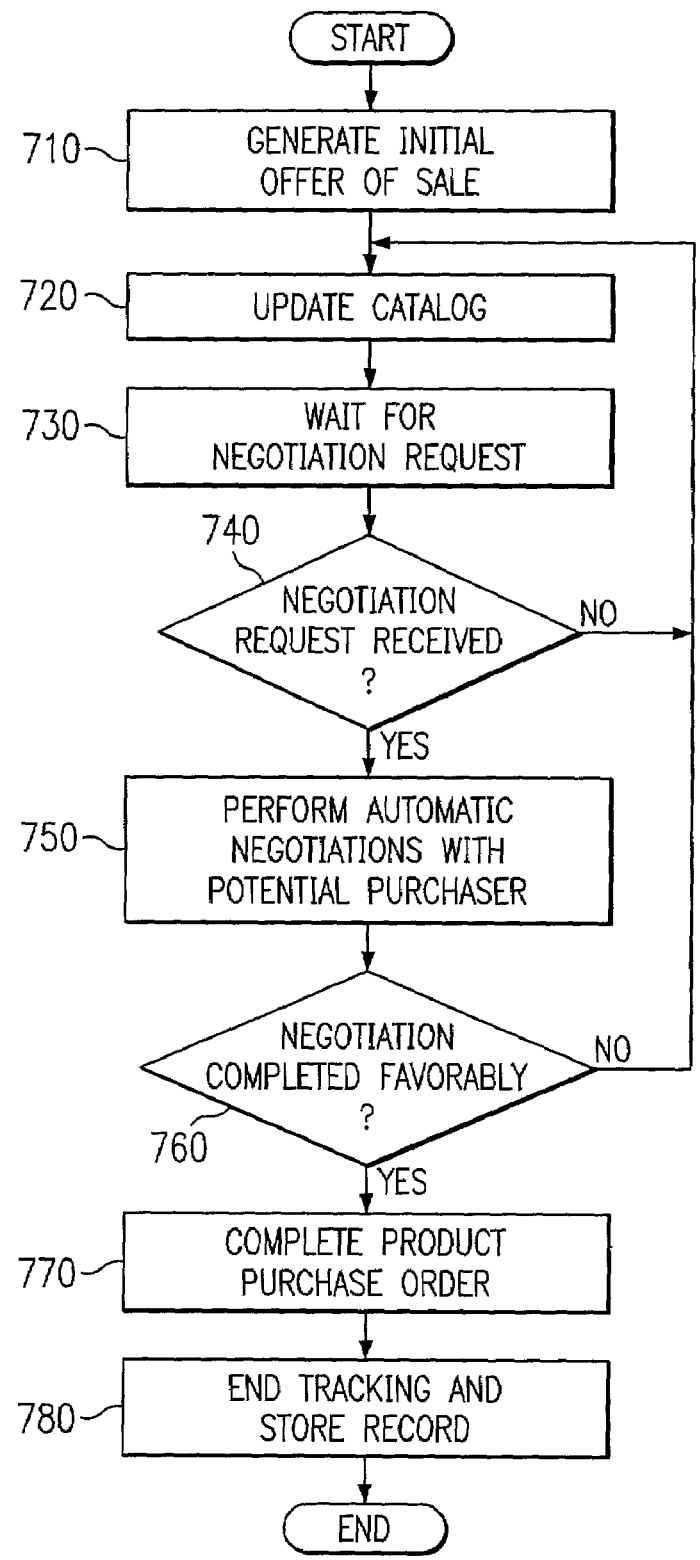
FIG. 7 is a flowchart outlining an exemplary operation of the operational selling decision making apparatus according to the present invention.

FIG. 7 is a flowchart outlining an exemplary operation of the present invention when performing automatic operational selling decisions. While the flowchart in FIG. 7 is described in terms of a single product, the operation may be performed in parallel, virtually simultaneously, for any number of products.

As shown in FIG. 7, the operation starts with a determination of an initial offer of sale for a product (step 710). The online catalog is updated to reflect this initial offer of sale of the product (step 720). The online catalog is provided to potential customers via a web site or the like. The online catalog may be personalized, as previously mentioned, based on the attributes of the potential customer. Alternatively, the initial offer of sale that is used to update the catalog may be sent to known or previous customers in an attempt to solicit business from these known or previous customers. Thus, the present invention may simply await being contacted by a potential customer, provide personalized presentations of the catalog to the potential customer, and/or initiate communication with a potential customer by sending the initial offer of sale for the product to the potential customer.

Whether awaiting contact from a potential customer, or soliciting business from known or previous customers, the operation then waits to receive a request for negotiation of sale of the product (step 730). If a request for negotiation is received (step 740), automatic negotiations are made with the requesting potential purchaser (step 750). These negotiations make use of the available information collected and obtained by the present invention as well as the strategic selling rules established by the firm.

If the negotiation is completed favorably (step 760), the product purchase order is then completed and payment is arranged (step 770). The tracking of the sale operation is then ended and a record of the sale operation is stored (step 780). The operation then ends.

Thus, the present invention provides an automated selling decision making apparatus, system and method that is capable of making operational selling decisions on a second-by-second basis. The automated selling decision making apparatus of the present invention makes use of information obtained from a variety of sources and strategic selling rules defined by the firm to guide the making of operational selling decisions. Such operational selling decisions may include negotiating the terms of sale of a product or service. In this way, humans associated with the firm need only make sure that the strategic selling rules reflect the business goals of the firm. The automated system of the present invention takes over the work of making each individual selling decision in view of these strategic selling rules.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of making selling decisions for selling a product or service, comprising:

storing one or more rules identifying strategic selling policies in a storage device in a computer system;

storing one or more attributes for the product or service to be sold in a storage device in the computer system;

automatically determining an initial offer of sale for the product or service;

automatically providing the initial offer of sale to a customer;

obtaining history information regarding the product or service;

determining acceptable terms of sale based on the history information;

receiving a modification, which was made by the customer, to the terms of sale;

automatically negotiating, by a negotiating engine in the computer system, with the customer terms of sale of the product or service based on the initial offer of sale, the acceptable terms of sale based on the history information, the one or more rules, and the one or more attributes of the product or service; and the negotiating engine automatically negotiates by determining and providing a counteroffer to each modification of the terms of sale made by the customer until the customer and the negotiating engine agree to mutually acceptable terms of sale.

2. The computer implemented method of claim 1, wherein the one or more rules include one or more rules directed to at least one of an identification of the types of products or services that are to be sold over a specified period of time, preferred terms and conditions of sale, preferred shipping or delivery policies, desired expiration times on orders, target selling prices, thresholds for minimum selling prices, target values for customer quality metrics, records of previous sales, identities, amounts and values of products or services previously sold, pre-agreed terms for specific customers or categories of customers, preferred or required bundles of products or services, information for calculating tradeoffs among different products or services, sets of products or services that may be substituted for each other, default policies for product returns, rank ordered or weighted lists of preferred customers, preferred payment methods, and parameters used in automated price calculation algorithms.

3. The computer implemented method of claim 1, wherein the one or more attributes includes at least one of a minimum price to be paid for the product or service, a minimum number of products or services for purchase, sets of products or services that may be offered as substitutes for each other, information about relative valuations or tradeoffs among products or services, information for determining tradeoffs among imperfectly substitutable products or services, information for determining tradeoffs between product or service prices, order size, and delivery times, information for determining tradeoffs between product or service prices and vendor preferences, thresholds for minimum acceptable quality measures.

4. The computer implemented method of claim 1, wherein the product or service is associated with a multi-attribute utility function that describes an interrelation between multiple attributes of the one or more attributes.

5. The computer implemented method of claim 1, wherein the one or more attributes are dynamically set.

6. The computer implemented method of claim 1, wherein the one or more attributes are fixed.

7. The computer implemented method of claim 1, wherein at least one of the one or more attributes is dynamically set and at least one of the one or more attributes is fixed.

8. The computer implemented method of claim 1, wherein a value of at least one of the one or more attributes is automatically set.

9. The computer implemented method of claim 1, wherein the history information includes at least one of production costs for the product or service, prices of similar or competing products or services, current or past sales and income on different products or services, estimates of historical measures of customer demand for the product or service, and customer click stream history.

10. The computer implemented method of claim 1, wherein automatically negotiating terms of sale of the product or service includes:
    obtaining exogenous preference information for a customer; and
    determining acceptable terms of sale based on the exogenous preference information.

11. The computer implemented method of claim 10, wherein the exogenous preference information includes at least one of identification of known or previous customers that are preferred, identification of known or previous customers that are to be avoided, rank ordering of customers, and rank ordering of customers to prefer for the product or service.

12. The computer implemented method of claim 1, wherein automatically negotiating terms of sale of the product or service includes:
    obtaining information about one of the product or service and the customer from a third party; and
    determining acceptable terms of sale based on the obtained information.

13. The computer implemented method of claim 1, wherein negotiating terms of sale of the product or service includes at least one of using a price setting method, using an automated bidding method, and haggling over terms of sale of the product or service.

14. The computer implemented method of claim 1, wherein negotiating terms of sale of the product or service includes negotiating based on one or more negotiation parameters including at least one of:
    thresholds on minimum acceptable price;
    parameters of algorithms used to calculate price changes to offer;
    thresholds on minimum acceptable quality;
    time-sensitive parameters;
    preferred increments in price when making counteroffers;
    preferences, weights, or rank orderings for evaluating tradeoffs among alternatives;
    tunable parameters of algorithms used in calculating offers; and
    rank orderings of preferred algorithms to use with particular purchasers.

15. The computer implemented method of claim 1, further comprising:
    storing a record of the sale.

16. The computer implemented method of claim 1, wherein automatically providing the initial offer of sale to the customer includes updating a on-line catalog listing for the product or service based on the initial offer of sale.

17. The computer implemented method of claim 1, wherein automatically providing the initial offer of sale to the customer includes transmitting the initial offer of sale to the customer prior to the customer requesting the initial offer of sale for the product or service.

18. The computer implemented method of claim 1, wherein the method is implemented in a distributed data processing system.

19. A computer program product in a computer readable medium for making selling decisions for selling a product or service, comprising:
    instructions for obtaining one or more rules identifying strategic selling policies;
    instructions for obtaining one or more attributes for the product or service to be sold;
    instructions for automatically determining an initial offer of sale for the product or service;
    instructions for automatically providing the initial offer of sale to a customer;
    instructions for obtaining history information regarding the product or service;
    instructions for receiving a modification, which was made by the customer, to the terms of sale;
    instructions for determining acceptable terms of sale based on the history information;
    instructions for automatically negotiating, using a negotiating engine in a computer system, terms of sale of the product or service based on the initial offer of sale, the acceptable terms of sale based on the history information, the one or more rules, and the one or more attributes of the product or service; and
    the negotiating engine automatically negotiates by determining and providing a counteroffer to each modification of the terms of sale made by the customer until the customer and the negotiating engine agree to mutually acceptable terms of sale.

20. The computer program product of claim 19, wherein the one or more rules include one or more rules directed to at least one of an identification of the types of products or services that are to be sold over a specified period of time, preferred terms and conditions of sale, preferred shipping or delivery policies, desired expiration times on orders, target selling prices, thresholds for minimum selling prices, target values for customer quality metrics, records of previous sales, identities, amounts and values of products or services previously sold, pre-agreed terms for specific customers or categories of customers, preferred or required bundles of products or services, information for calculating tradeoffs among different products or services, sets of products or services that may be substituted for each other, default policies for product returns, rank ordered or weighted lists of preferred customers, preferred payment methods, and parameters used in automated price calculation algorithms.

21. The computer program product of claim 19, wherein the one or more attributes includes at least one of a minimum price to be paid for the product or service, a minimum number of products or services for purchase, sets of products or services that may be offered as substitutes for each other, information about relative valuations or tradeoffs among products or services, information for determining tradeoffs among imperfectly substitutable products or services, information for determining tradeoffs between product or service prices, order size, and delivery times, information for determining tradeoffs between product or service prices and vendor preferences, thresholds for minimum acceptable quality measures.

22. The computer program product of claim 19, wherein the product or service is associated with a multi-attribute utility function that describes an interrelation between multiple attributes of the one or more attributes.

23. The computer program product of claim 19, wherein the one or more attributes are dynamically set.

24. The computer program product of claim 19, wherein the one or more attributes are fixed.

25. The computer program product of claim 19, wherein at least one of the one or more attributes is dynamically set and at least one of the one or more attributes is fixed.

26. The computer program product of claim 19, wherein a value of at least one of the one or more attributes is automatically set.

27. The computer program product of claim 19, wherein the history information includes at least one of production costs for the product or service, prices of similar or competing products or services, current or past sales and income on different products or services, estimates of historical measures of customer demand for the product or service, and customer click stream history.

28. The computer program product of claim 19, wherein the instructions for automatically negotiating terms of sale of the product or service include:
　instructions for obtaining exogenous preference information for a customer; and
　instructions for determining acceptable terms of sale based on the exogenous preference information.

29. The computer program product of claim 28, wherein the exogenous preference information includes at least one of identification of known or previous customers that are preferred, identification of known or previous customers that are to be avoided, rank ordering of customers, and rank ordering of customers to prefer for the product or service.

30. The computer program product of claim 19, wherein the instructions for automatically negotiating terms of sale of the product or service includes:
　instructions for obtaining information about one of the product or service and the customer from a third party; and
　instructions for determining acceptable terms of sale based on the obtained information.

31. The computer program product of claim 19, wherein the instructions for negotiating terms of sale of the product or service include at least one of instructions for using a price setting method, instructions for using an automated bidding method, and instructions for haggling over terms of sale of the product or service.

32. The computer program product of claim 19, wherein the instructions for negotiating terms of sale of the product or service include instructions for negotiating based on one or more negotiation parameters including at least one of:
　thresholds on minimum acceptable price;
　parameters of algorithms used to calculate price changes to offer;
　thresholds on minimum acceptable quality;
　time-sensitive parameters;
　preferred increments in price when making counteroffers;
　preferences, weights, or rank orderings for evaluating tradeoffs among alternatives;
　tunable parameters of algorithms used in calculating offers; and
　rank orderings of preferred algorithms to use with particular purchasers.

33. The computer program product of claim 19, further comprising:
　fourth instructions for storing a record of the sale.

34. The computer program product of claim 19, wherein the instructions for automatically providing the initial offer of sale to the customer include instructions for updating a on-line catalog listing for the product or service based on the initial offer of sale.

35. The computer program product of claim 19, wherein the instructions for automatically providing the initial offer of sale to the customer include instructions for transmitting the initial offer of sale to the customer prior to the customer requesting the initial offer of sale for the product or service.

36. The computer program product of claim 19, wherein the computer program product is executed in a distributed data processing system.

37. An apparatus for making selling decisions for selling a product or service, comprising:
　a first storage device for storing one or more rules identifying strategic selling policies;
　a second storage device for storing one or more attributes for the product or service to be sold; and
　a controller coupled to the first storage device and the second storage device, wherein the controller automatically determines an initial offer of sale for the product or service, automatically provides the initial offer of sale to a customer, obtains history information regarding the product or service using a data collection device, determines acceptable terms of sale based on the history information using a negotiation engine, receives, by the negotiation engine, a modification, which was made by the customer, to the terms of sale made by the customer, and automatically negotiates, using the negotiation engine, terms of sale of the product or service based on the initial offer of sale, the acceptable terms of sale based on the history information, the one or more rules, and the one or more attributes of the product or service, the negotiation engine automatically negotiates by determining and providing a counteroffer to each modification of the terms of sale made by the customer until the customer and the negotiation engine agree to mutually acceptable terms of sale.

38. The apparatus of claim 37, wherein the controller automatically negotiates terms of sale of the product or service by:
　obtaining exogenous preference information for a customer using a data collection device; and
　determining acceptable terms of sale based on the exogenous preference information using a negotiation engine.

39. The apparatus of claim 37, wherein the controller automatically negotiates terms of sale of the product or service by:
　obtaining information about one of the product or service and the customer from a third party using a data collection device; and
　determining acceptable terms of sale based on the obtained information using a negotiation engine.

40. The apparatus of claim 37, wherein the controller automatically negotiates terms of sale of the product or service using at least one of a price setting method, an automated bidding method, and haggling over terms of sale of the product or service.

41. The apparatus of claim 37, further comprising:
a transaction record storage device that stores a record of the sale.

42. The apparatus of claim 37, wherein the controller automatically provides the initial offer of sale to the customer by updating a on-line catalog listing for the product or service based on the initial offer of sale using an on-line catalog device.

43. The apparatus of claim 37, wherein the controller automatically provides the initial offer of sale to the customer by transmitting the initial offer of sale to the customer prior to the customer requesting the initial offer of sale for the product or service.

* * * * *